5/11/82 OR 4,329,022

United States Patent [19]
Yamaguchi et al.

[11] 4,329,022
[45] May 11, 1982

[54] TWO GROUP TYPE ZOOM LENS WITH WIDE IMAGE ANGLE

[75] Inventors: Shin Yamaguchi, Hiratsuka; Akira Tajima, Kawasaki; Keiji Ikemori, Yokohama, all of Japan

[73] Assignee: Canon Kabushiki Kaisha, Tokyo, Japan

[21] Appl. No.: 147,298

[22] Filed: May 6, 1980

[30] Foreign Application Priority Data

May 10, 1979 [JP] Japan .................................. 54-57480

[51] Int. Cl.³ ............................................. G02B 15/14
[52] U.S. Cl. .................................................... 350/426
[58] Field of Search ................................ 350/423, 426

[56] References Cited
U.S. PATENT DOCUMENTS 4,147,410  4/1979  Shimomura et al. ............... 350/426
4,190,323  2/1980  Ogawa et al. ........................ 350/423
4,251,132  2/1981  Okudaira ............................. 350/426

FOREIGN PATENT DOCUMENTS 2758688  7/1978  Fed. Rep. of Germany ...... 350/426

Primary Examiner—John K. Corbin
Assistant Examiner—Scott J. Sugarman
Attorney, Agent, or Firm—Toren, McGeady and Stanger

[57] ABSTRACT

The disclosed two-group wide-image-angle zoom lens is zoomed by changing the distance between the front and the rear group. The front group exhibits a negative refracting power and includes a first positive lens, a second negative lens concave toward the image end, a third positive lens, a fourth negative lens concave toward the image end, and a fifth positive image lens convex toward the object end, all in sequence; the rear group is closer to the image end than the front group, exhibits a positive refracting power, and includes a first positive sub-group, a second positive sub-group, a third negative sub-group, and a fourth positive sub-group.

4 Claims, 60 Drawing Figures

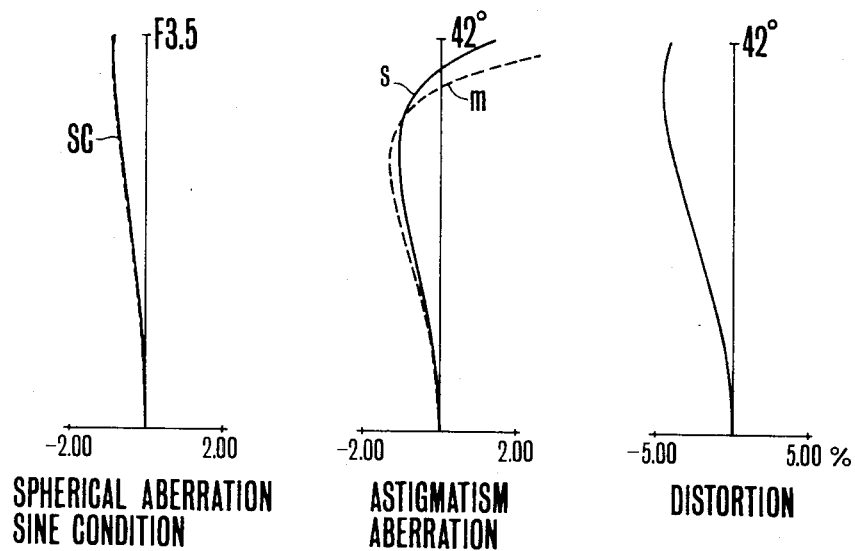
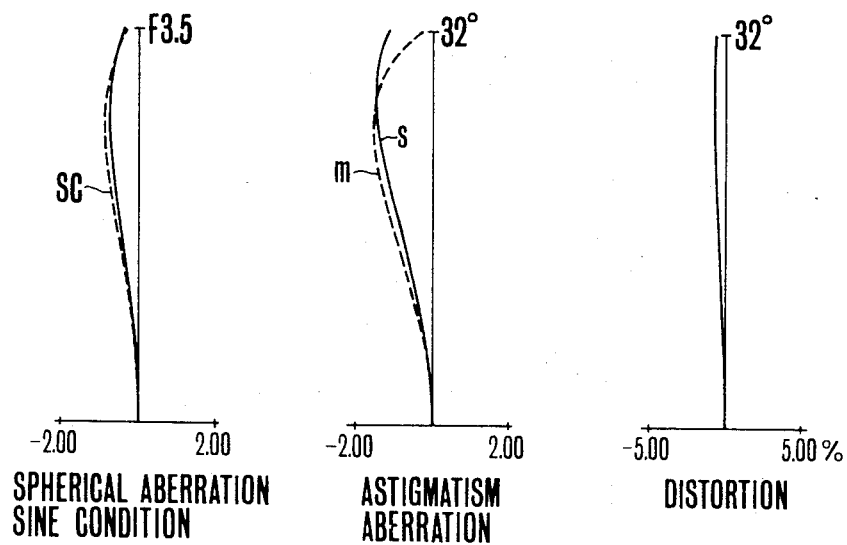

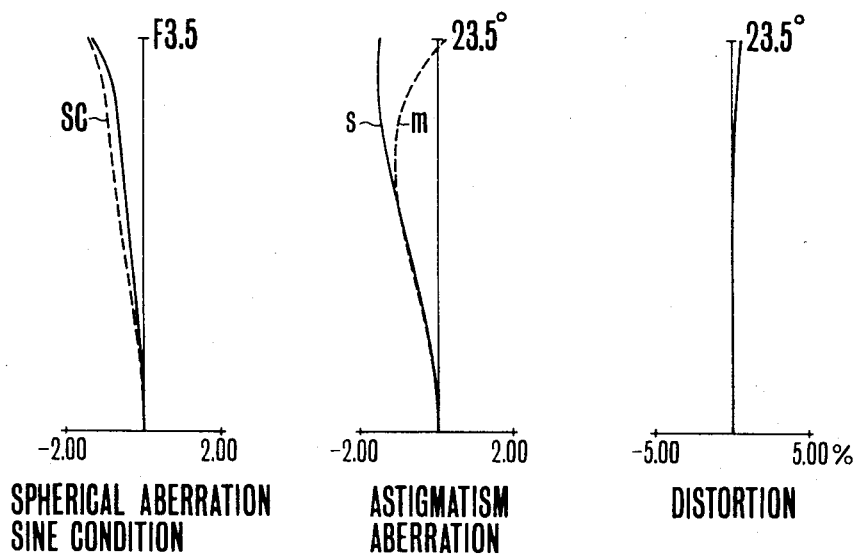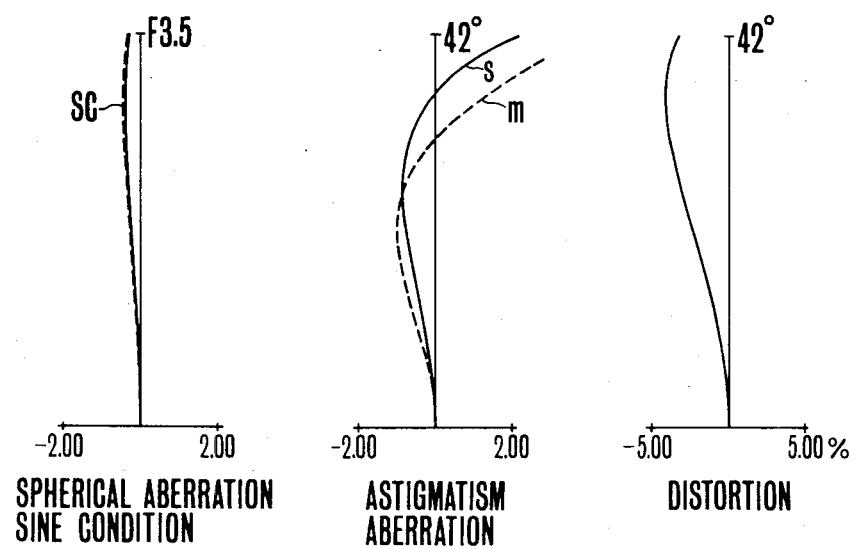

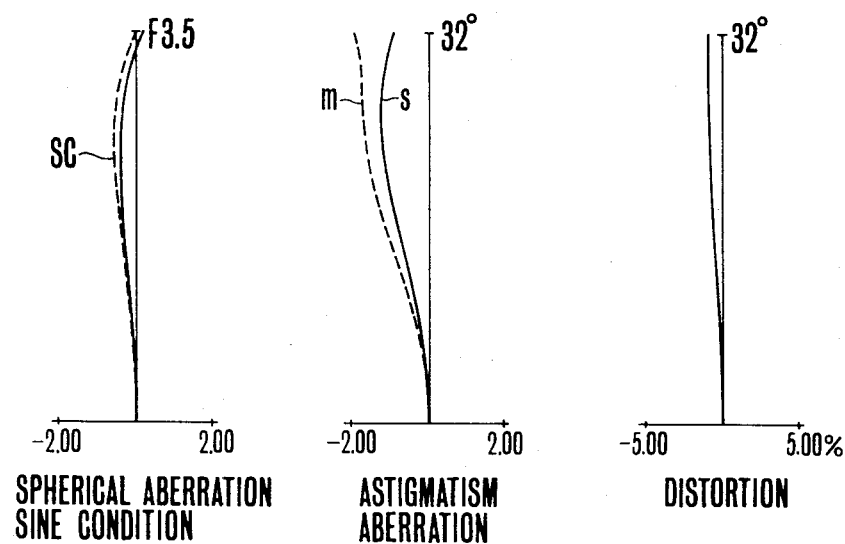
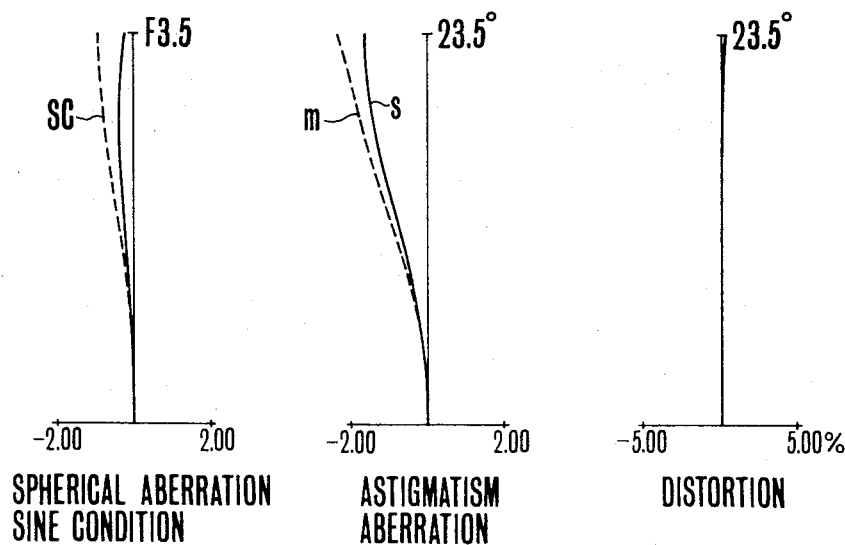

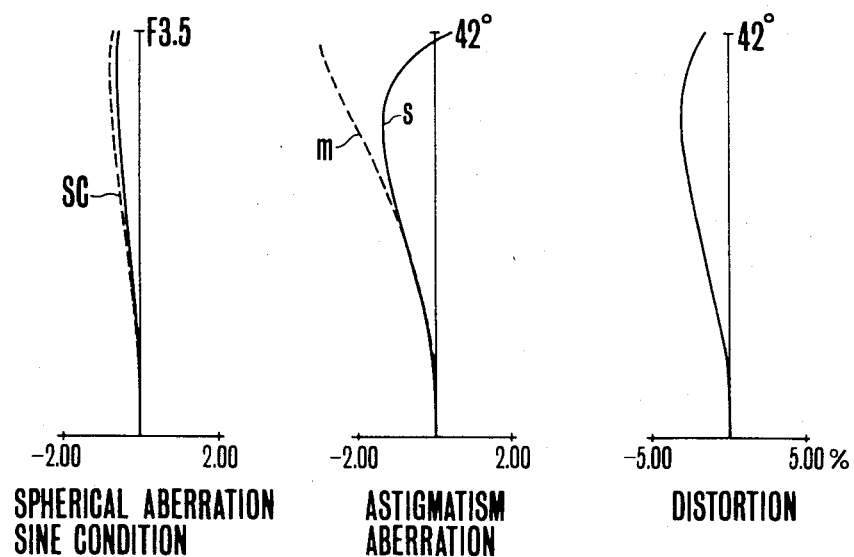
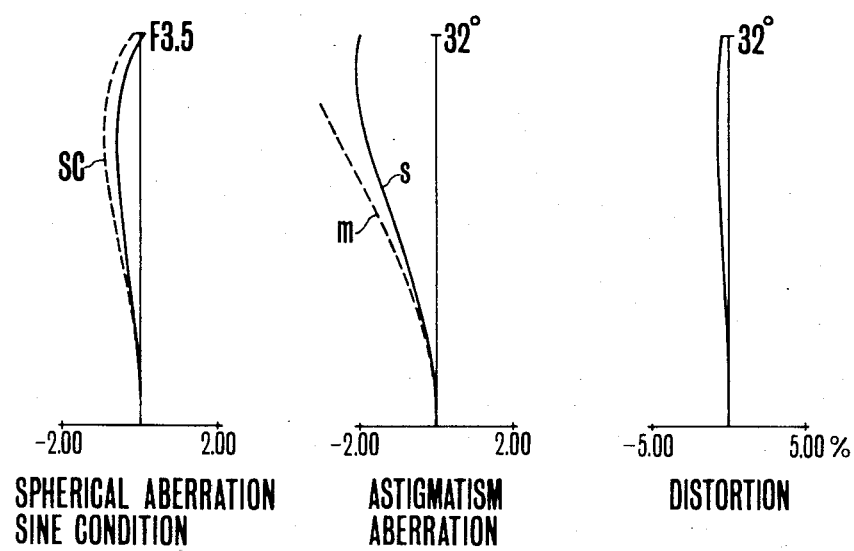

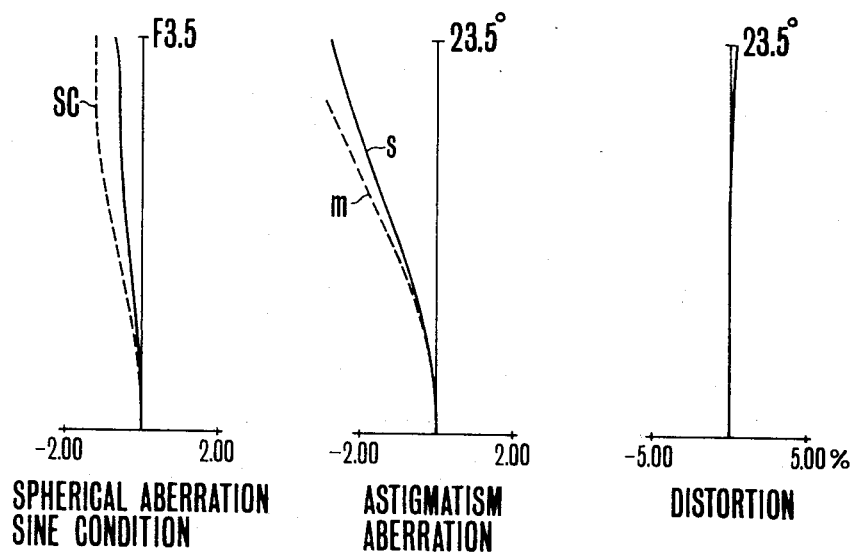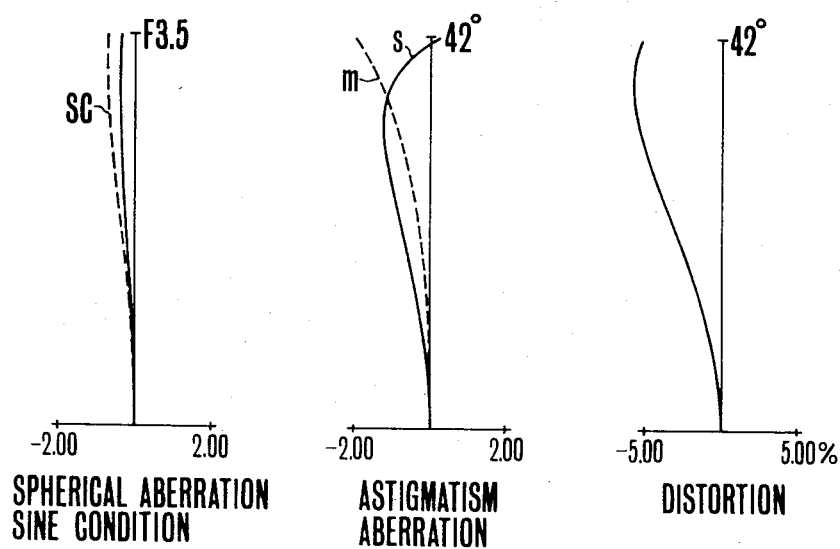

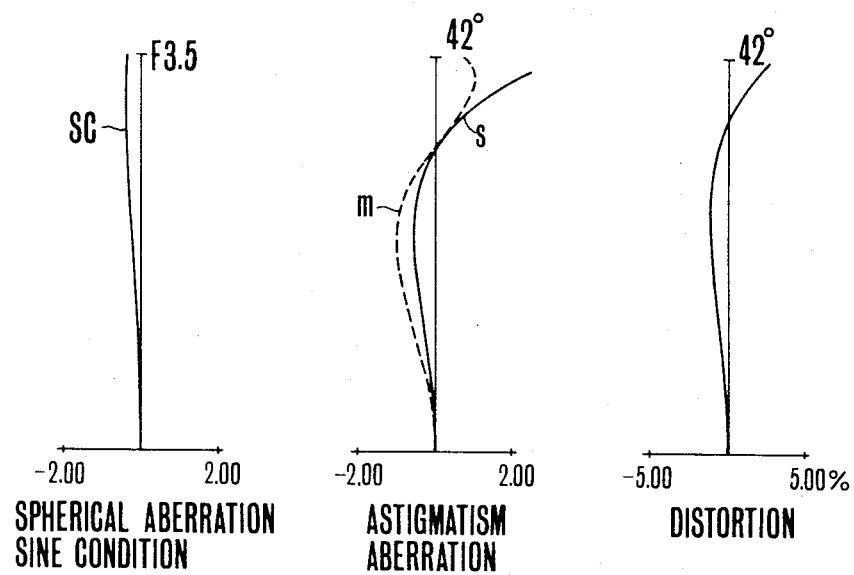
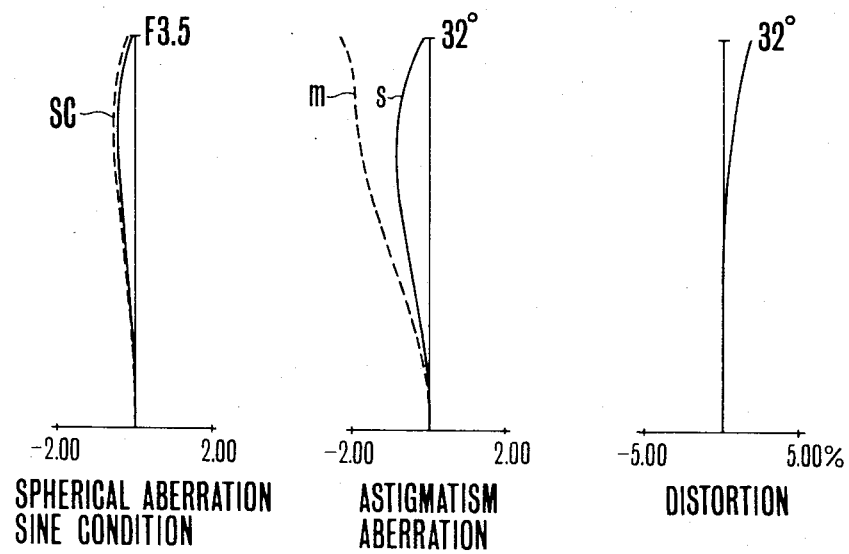

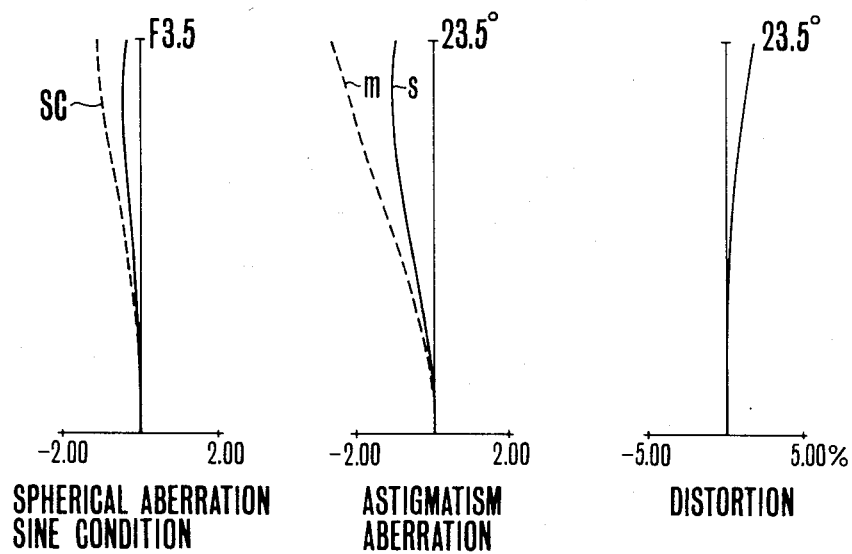
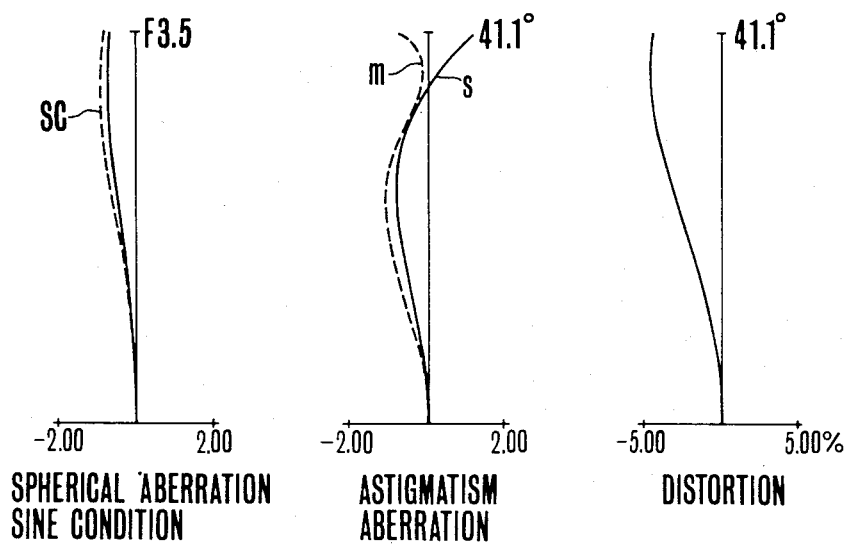

TWO GROUP TYPE ZOOM LENS WITH WIDE IMAGE ANGLE

BACKGROUND OF THE INVENTION

1. Field of the Invention

The present invention relates to a photographing lens, particularly a two group type zoom lens whose front lens group has a negative refractive power.

2. Description of the Prior Art

Zoom lenses whose front lens groups have a negative refractive power may be divided into two classes. In one class, the frontmost lens is positive as disclosed in U.S. Pat. Nos. 4,142,779, 4,147,410, and 4,169,660, and in the other class, the foremost lens is negative as disclosed in U.S. Pat. No. 3,848,969.

In such zoom lenses, the frontmost positive lens of the front group is intended to correct distortion. However, when the zoom ratio is large, and when the image angle in the wide angle position is wide, difficulties tend to arise in correcting distortion and astigmatic aberrations. This arises because in this type of lens, the incident height of the off-axis principal ray striking the positive lens is large, while the power of the air lens formed by the rear surface of the first lens and the front surface of the second lens is also large. Hence, when the distortion of the largest image angle in the wide angle position is adequately corrected, substantial barrel distortion occurs for a middle image angle. On the other hand, when the distortion for a middle image angle is adequately corrected, the astigmatic aberration at the largest image angle becomes too large to be corrected.

Furthermore, in such a zoom system, there is a tendency for the image angle more or less to increase at very close photographic distances. Hence, when the power of the aforementioned air lens is great, the angle at which the ray with the largest image angle emerges from the first lens at a position very close to the end of the wide angle position is abruptly increased. Thus, the diameter of the front lens must be quite large. This is a disadvantage in a compact lens. Moreover, in such a lens, the foremost lens is negative so that the position of the rear principal point of the front group is quite large from the rearmost face of the image end of the front group toward the object end. Therefore, it is necessary to provide a large principal point distance between the front group and the rear group at the extreme wide angle position. This results in a large total length that is inconvenient in a compact system. As a further point, the incident height of the principal ray away from the optical axis upon the lens face is small. Hence, it is difficult to correct the distortion at the end of the wide angle position, at which the largest image angle is as large as 84°.

SUMMARY OF THE INVENTION

An object of the present invention is to obtain a wide image angle at the short focal length.

Another object of the present invention is to make the whole system compact.

Further another object of the present invention is to correct the aberrations, particularly the distortion and the astigmatism aberration at the wide angle side.

In many cases of the zoom lens whose frontmost lens is positive, the frontmost lens and the rearmost lens in the front group are positive lenses, between which a plural number of negative lenses are arranged, while in accordance with the present invention a positive lens for correcting various aberrations is arranged between the negative lenses.

In the invention, a front group having a negative refracting power and a rear group having a positive refracting power are arranged in sequence from the object end. The front group consists of a first positive lens having a strong positive refracting power at the object side, a second negative meniscus lens having a strong negative refracting power at the image end, a third lens having a strong positive refracting power at the image end, a fourth bi-concave lens having a strong negative refracting power at the image end and a fifth positive lens having a strong positive refracting power at the object end in sequence from the object end, while the rear group consists of two positive lenses, a bi-concave lens and more than one positive lens in sequence from the object end.

Because the first lens and the third lens are in the front group, the positive lenses are used in the correction of distortion in the wide angle position. It is now possible to adequately correct the astigmatism, something which contributes much to the realization of the compact and highly efficient system. Specifically, by arranging two positive lenses it becomes possible to correct the aberrations without making the power of the air lens formed between the first and the second lens strong. Hence, the diameter of the front lens can be decreased while the distortion and the astigmatism aberration from the middle image angle to the largest image angle can effectively be corrected.

In the above, the relations:

$$f1 \geq 1.2\, f3 \tag{1}$$

$$N3 < N4 \tag{2}$$

$$0.06 \leq \frac{r6 - r7}{r6 \cdot r7} \cdot fT \leq 0.39 \tag{3}$$

are established. Here;

ft is the focal length of the whole system at the end of the telephoto side.

f1 is the focal length of the first lens.

f3 is the focal length of the third lens.

N3 is the refracting power of the third lens (d-line).

N4 is the refracting power of the fourth lens (d-line).

r6 is the radius of curvature at the image side of the third lens in the front group.

r7 is the radius of curvature at the object side of the fourth bi-concave lens in the front group.

BRIEF DESCRIPTION OF THE DRAWINGS

FIGS. 7A–7C respectively show the aberrations of the first embodiment at the short focal length.

FIGS. 8A-8C respectively show the aberrations of the first embodiment at the middle focal length.

FIGS. 9A-9C respectively show the aberrations of the first embodiment at the long focal length.

FIGS. 10A-10C respectively show the aberrations of the second embodiment at the short focal length.

FIGS. 11A-11C respectively show the aberrations of the second embodiment at the middle focal length.

FIGS. 12A-12C respectively show the aberrations of the second embodiment at the long focal length.

FIGS. 13A-13C respectively show the aberrations of the third embodiment at the short focal length.

FIGS. 14A-14C respectively show the aberrations of the third embodiment at the middle focal length.

FIGS. 15A-15C respectively show the aberrations of the third embodiment at the long focal length.

FIGS. 16A-16C respectively show the aberrations of the fourth embodiment at the short focal length.

FIGS. 19A-19C respectively show the aberrations of the fifth embodiment at the short focal length.

FIGS. 20A-20C respectively show the aberrations of the fifth embodiment at the middle focal length.

FIGS. 21A-21C respectively show the aberrations of the fifth embodiment at the long focal length.

FIGS. 22A-22C respectively show the aberrations of the sixth embodiment at the short focal length.

DESCRIPTION OF THE PREFERRED EMBODIMENTS

Figure 1:
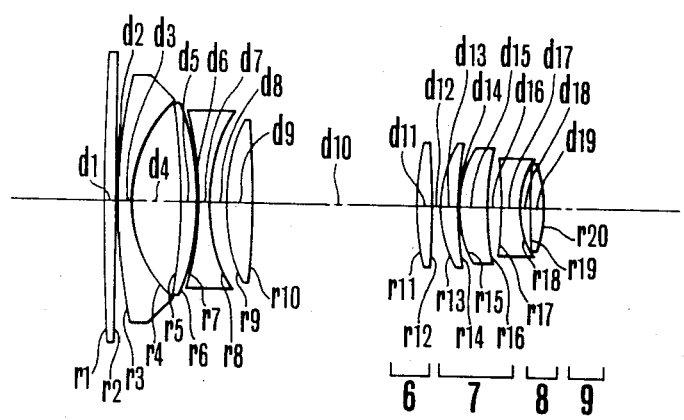
FIG. 1 shows a section of the lens in accordance with a first embodiment.
Figure 2:
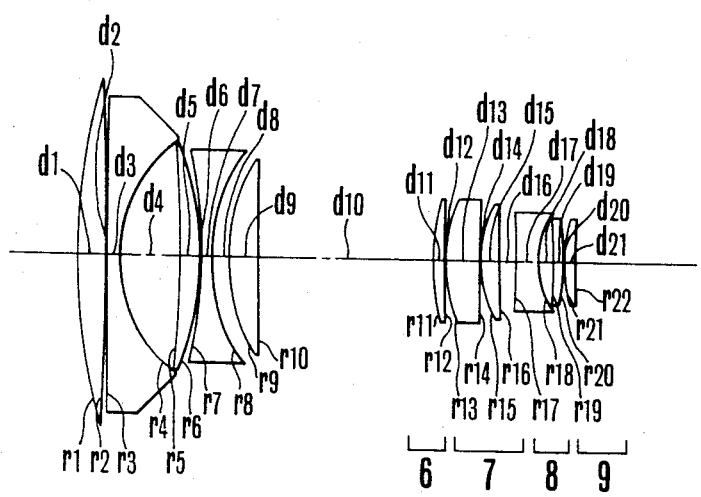
FIG. 2 shows a section of the lens in accordance with a second embodiment.
Figure 3:
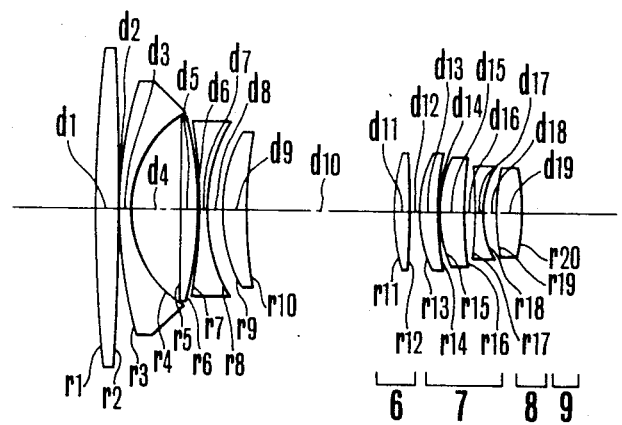
FIG. 3 shows a section of the lens in accordance with a third embodiment.
Figure 4:
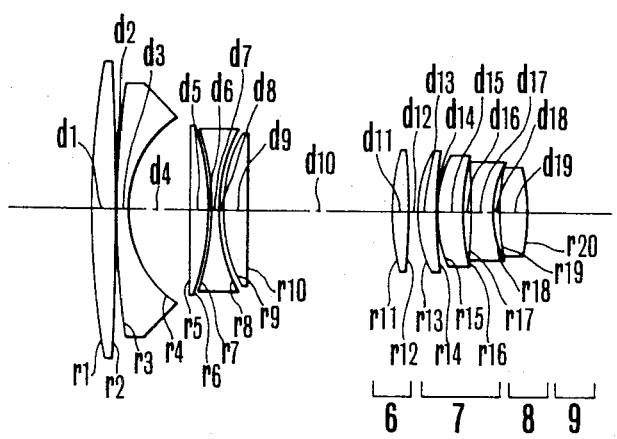
FIG. 4 shows a section of the lens in accordance with a fourth embodiment.
Figure 5:
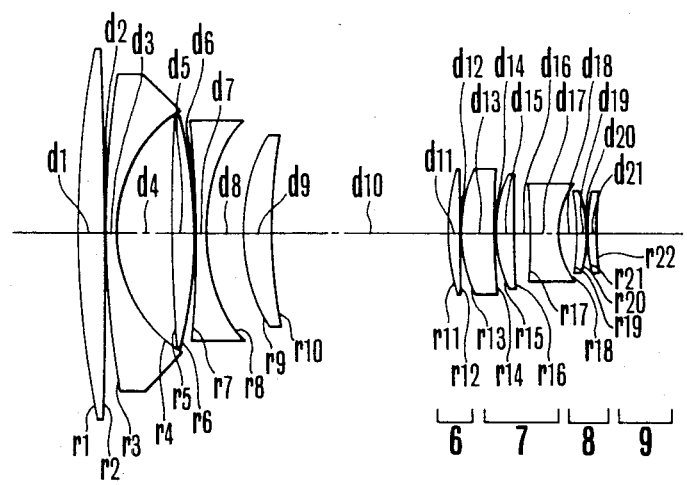
FIG. 5 shows a section of the lens in accordance with a fifth embodiment.
Figure 6:
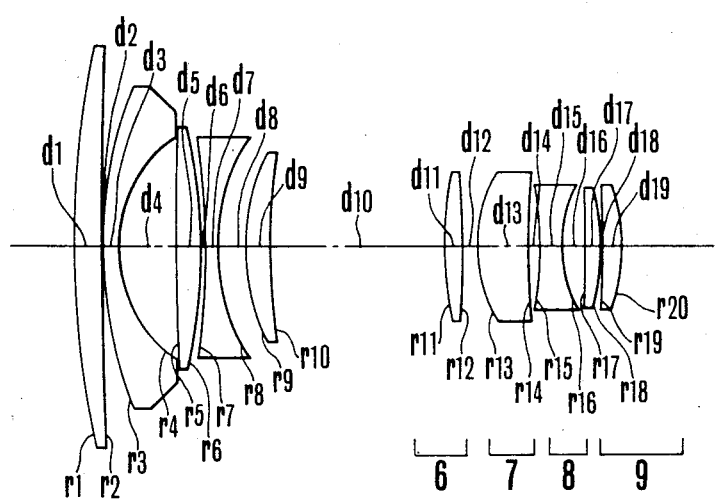
FIG. 6 shows a section of the lens in accordance with a sixth embodiment.

In case of the lenses shown in FIGS. 1 to 6, the front group corresponds to the lens surfaces r1 to r10, while the rear group corresponds to the lens surfaces r11 to r20 respectively r11 to r22.

At the time of the zooming operation the front group and the rear group are moved at the same time, and the distance between the front and the rear group is varied in order to change the focal length of the whole system. The position of the image surface is mechanically compensated. The focussing is adjusted by moving the front group.

Below, the meaning of the conditions (1) to (3) will be explained.

With reference to condition (1), the distortion correction effect for the first and third lens in the front group is larger in the wide angle condition as explained above, so that the incident height of the ray, distant from the optical axis, is larger upon the first lens than upon the third lens.

Consequently, even if the power of the first lens is selected weaker than that of the third lens, the equivalent correction effect can be obtained. Hence, unless the condition should be fulfilled, the power of the first lens would be so strong that when the distortion at the largest image angle at the end of the wide angle range is properly corrected, much barrel distortion remains at the middle image angle. On the other hand, when the distortion at the middle image angle is properly corrected, the astigmatic aberration at the largest image angle is quite large so that it is difficult to correct the distortion and the astigmatic aberration simultaneously.

Conditions (2) and (3) relate to the air lens formed with the third and the fourth lenses. The air lens has the effect of correcting the distortion by means of the difference between the incident height of the ray distant from the optical axis upon the surface r6 and that upon the surface r7. In order to obtain a difference between the incident height of the ray distant from the optical axis upon the r6 surface and that upon the r7 surface, it is possible to think of a method for making the radius of curvature of the r6 surface almost equal to that of the r7 surface and increasing the air gap between the r6 surface and the r7 surface. However, this is quite disadvantageous for realizing the compact system because of an increase of the lens diameter and the whole length. Also, the astigmatic aberration at the middle of the picture is quite large, beyond correction. This is also disadvantageous. Consequently, in accordance with the present invention, the distance between the lens surface along the optical axis is not made large but the radius of curvature of the r6 surface is made different from that of the r7 surface in order to obtain a difference between the incident height of the rays distant from the optical axis. In order to meet the above purpose, the condition $r7 > r6 > 0$ is used at r6 and r7. Thus, if the condition (2) is not fulfilled due to the strongly convex surface of the r6 surface the ray most distant from the optical axis is apt to be totally reflected. Further, the condition (2) is also essential in order to keep the field curvature with the front group by keeping the negative Petzval's sum as small as possible. Beyond the upper limit of the condition (3) the positive power of the air lens is so strong that the astigmatic aberration at the end of the wide angle side is under corrected. Beyond the lower limit the barrel distortion at the middle image angle or the astigmatic aberration at the largest image angle is so great that the distortion or the aberration is under corrected to the point that it becomes difficult to adequately correct the astigmatic aberration and the distortion at the end of the wide angle range.

Now, let us suppose that the front group consists of a positive, a negative, a positive, a negative and a positive lens in sequence and the focal lengths of the first to the fifth lens are f1, f2, f3, f4 and f5. When the relation $f1 > f3 > f5$ is applied to the positive lenses, the relation $f2 > f4$ is applied to the negative lenses, the power of the lenses upon which the ray distant from the optical axis is incident at large height is selected strong and that of the lens upon which the ray distant from the optical axis is incident at small height is selected weak, the ray distant from the optical axis is not refracted very strongly by any lens so that the ray distant from the optical axis is refracted smoothly by the first to the last lens in such a manner that the aberration distant from the optical axis can be made small.

Further, the rear group is a variation of the triplet lens, so that positive lenses with strong power are arranged before negative lenses so as to position the front principal point as close to the front group as possible in order to realize a compact system on a practical basis.

The above construction fulfills basic conditions. By fulfilling further conditions a much higher efficiency can be obtained.

The rear group is formed of a sixth positive lens having a strong positive refractive force at the object side, a seventh meniscus lens group having one or two positive meniscus lenses convex toward the object, an eighth negative lens having a strong negative force at the image side and a ninth positive lens group having one or two positive lenses. Now, let the refractive indices (d-line) of the first, the second, the fifth, the sixth and the eighth lens be N1, N2, N5, N6 and N8, have mean values of the refractive indices of the seventh, and the ninth lens group be $\overline{N7}$, $\overline{N9}$, the Abbe's number of the sixth and the eighth lens be ν5, ν6 and ν8 and the mean value of the Abbe's number of the seventh lens be ν7, so the following conditions are fulfilled:

$$\frac{N1 + N3 + N5}{3} < \frac{N2 + N4}{2} \quad (4)$$

$$0.1 \leq N8 - \frac{N6 + \overline{N7}}{2} \leq 0.36 \quad (5)$$

$$0.07 \leq N8 - \overline{N9} \leq 0.32 \quad (6)$$

$$\nu5 \leq 35 \quad (7)$$

$$\frac{\nu6 + \overline{\nu7}}{2} \geq 49 \quad (8)$$

$$\nu8 \leq 32. \quad (9)$$

The relation (4) is essential in order to keep the Petzval's sum small. If this relation is not fulfilled, the distortion on the image surface becomes too large. Further, although the front group has as a whole a negative power, the number of the positive lenses is larger than that of the negative lenses, so that unless the refractive index of the negative lenses should be increased so as to increase the radius of curvature of the surfaces of the negative lenses aberrations of a higher degree would take place, which makes the smooth correction difficult.

The relations (5) and (6) are essential in order to obtain a small Petzval's sum as a whole by correcting the positive Petzval's sum of the rear group with the negative Petzval's sum of the front group. Beyond the upper limit of the relation (5) and/or (6) the distortion on the image surface becomes too small. As far as the ordinary optical glass is concerned, a proper combination of glasses is difficult under the conditions (8) and (9). Further, beyond the lower limit the positive Petzval's sum of the rear group becomes so small that the Petzval's sum of the whole system becomes negative.

The relation (7) is essential in order to adequately correct the chromatic aberration along the optical axis of the front group by making the fifth lens with glass material of high dispersion. Although it is effective to make the positive lenses with glass material of high dispersion in order to correct the over-corrected chromatic aberration taking place in the front group, if the first and the third lens are made of glass material with very high dispersion chromatic aberration of magnification is apt to take place. This is disadvantageous. Further, when the relation is not fulfilled the variation of the chromatic aberration due to zooming and focussing becomes very large, beyond the permitted value.

The relations (8) and (9) concern to the correction of the chromatic aberration in the rear group. It is desirable to place the positive lens group closer to the object than the eighth negative lens with glass material with low dispersion because the power of the lens group is strong and the eighth negative lens is with a glass material with high dispersion. If the relations are not fulfilled, the under-corrected chromatic aberration (short wave length, for example g-line) takes place in the near group. Even if this under-correction is cancelled with the over-corrected chromatic aberration taking place in the front group, the under-correction is cancelled only at one position during the zooming so that the variation of the chromatic aberration due to the zooming becomes large.

As explained above, in accordance with the present invention compact, high efficiency wide angle zoom lenses with zoom ratio of about 2 at the image angle about 84° at the end of the wide angle side, which has so far been considered to be difficult to realize, can be realized as in case of the embodiments.

Figures 17A, 17B, 17C:
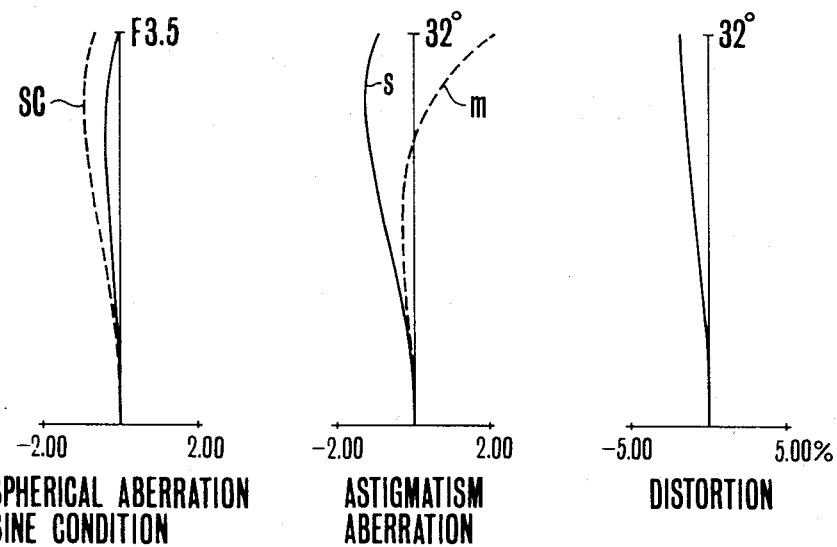
FIGS. 17A-17C respectively show the aberrations of the fourth embodiment at the middle focal length.
Figures 18A, 18B, 18C:
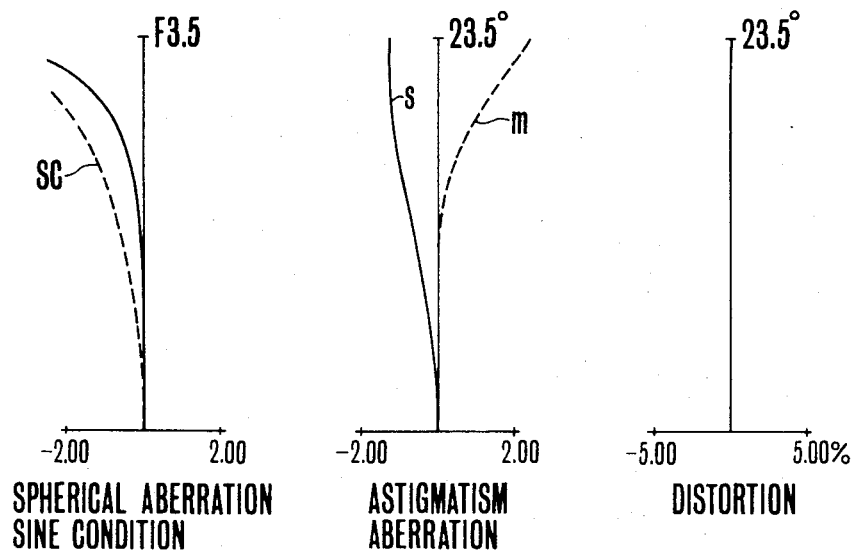
FIGS. 18A-18C respectively show the aberrations of the fourth embodiment at the long focal length.
Figures 23A, 23B, 23C:
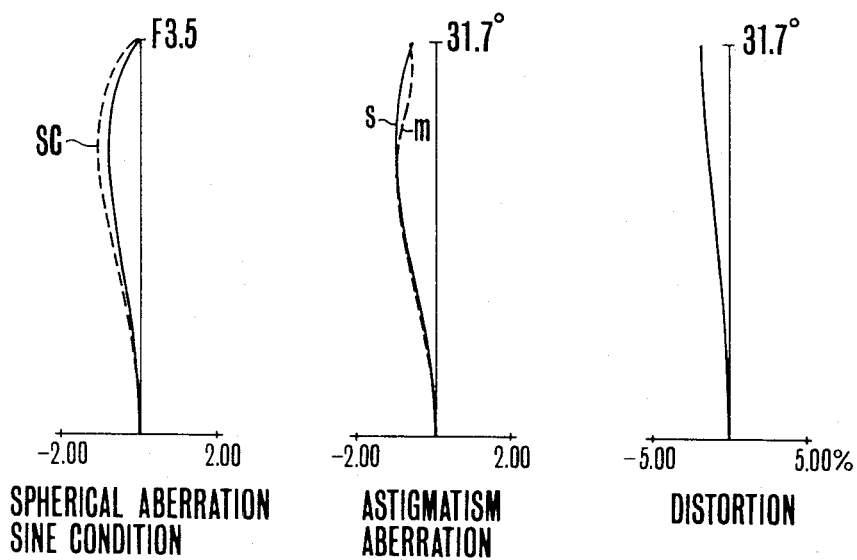
FIGS. 23A-23C respectively show the aberrations of the sixth embodiment at the middle focal length.
Figures 24A, 24B, 24C:
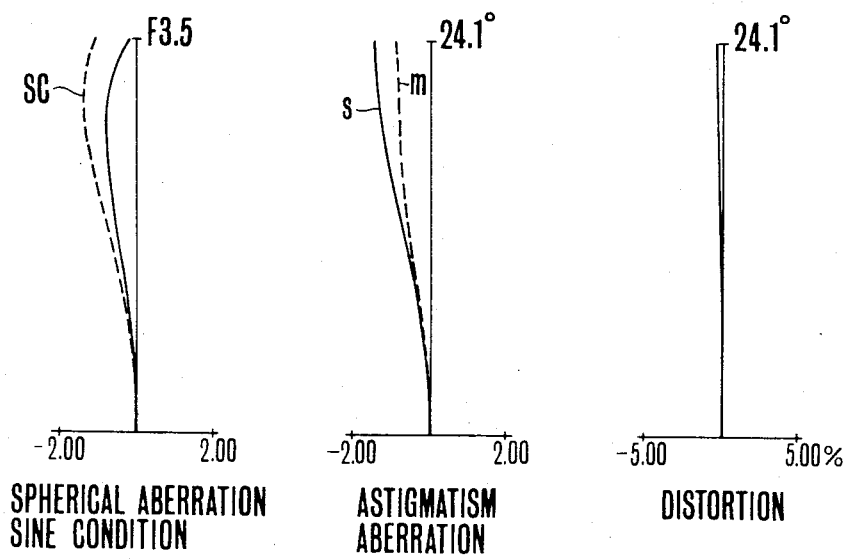
FIGS. 24A-24C respectively show the aberrations of the sixth embodiment at the long focal length.

The lens compositions are shown in FIGS. 1 to 6. The spherical aberration, the Sine condition, the astigmatic aberration and the distortion at the wide angle side, at the middle and at the telephoto side for an object at infinitive distance are respectively shown in FIGS. 7 to 9, FIGS. 10 to 12, FIGS. 13 to 15, FIGS. 16 to 18, FIGS. 19 to 21 and FIGS. 22 to 24.

EXAMPLE 1

Focal Length f = 100–198   F.No. = 3.5
Image Angle 2ω = 84°–47°

| No. | Radius of Curvature r | Surface Distance d | Refractive Index n | Dispersion ν |
|---|---|---|---|---|
| 1 | 1761.568 | 10.51 | 1.6228 | 57 |
| 2 | −4909.441 | 0.4 | | |
| 3 | 413.75 | 9.68 | 1.72342 | 38 |
| 4 | 102.351 | 40.77 | | |
| 5 | −617.581 | 14.44 | 1.61293 | 37 |
| 6 | −204.96 | 1.36 | | |
| 7 | −265.984 | 7.26 | 1.7725 | 49.6 |
| 8 | 128.702 | 14.84 | | |
| 9 | 146.573 | 20.24 | 1.6668 | 33 |
| 10 | −837.348 | d10 | | |
| 11 | 198.573 | 12.95 | 1.51633 | 64.1 |
| 12 | −588.064 | 8.06 | | |
| 13 | 104.194 | 13.63 | 1.51633 | 64.1 |
| 14 | 390.064 | 0.4 | | |
| 15 | 96.625 | 22.14 | 1.51633 | 64.1 |
| 16 | 220.726 | 11.13 | | |
| 17 | −503.407 | 15.18 | 1.80518 | 25.4 |
| 18 | 72.823 | 7.14 | | |
| 19 | 292.117 | 11.05 | 1.62606 | 39.1 |
| 20 | −117.764 | | | |

| Focal Length f | 100 | 140 | 198 |
|---|---|---|---|
| Variable Distance d10 | 134.13 | 57.39 | 4.09 |

EXAMPLE 2

Focal Length f = 100–198   F.No. = 3.5
Image Angel 2ω = 84°–47°

| No. | Radius of Curvature r | Surface Distance d | Refractive Index n | Dispersion ν |
|---|---|---|---|---|
| 1 | 473.75 | 22.06 | 1.6668 | 33 |
| 2 | −3737.097 | 0.4 | | |
| 3 | 4028.226 | 9.92 | 1.72342 | 38 |
| 4 | 109.355 | 47.54 | | |
| 5 | −1378.871 | 17.30 | 1.60323 | 42.3 |
| 6 | −234.516 | 1.21 | | |
| 7 | −410.992 | 7.78 | 1.7725 | 49.6 |
| 8 | 134.052 | 15.18 | | |
| 9 | 144.407 | 22.67 | 1.6727 | 32.1 |
| 10 | 3193.096 | d10 | | |
| 11 | 213.786 | 8.19 | 1.51633 | 64.1 |
| 12 | 1546.169 | 0.43 | | |
| 13 | 113.71 | 27.18 | 1.51633 | 64.1 |
| 14 | 1069.274 | 0.4 | | |
| 15 | 89.435 | 15.08 | 1.51633 | 64.1 |
| 16 | 766.573 | 13.39 | | |
| 17 | −368.048 | 18.23 | 1.71736 | 29.5 |
| 18 | 67.323 | 13.31 | | |
| 19 | −688.911 | 8.63 | 1.62041 | 60.3 |
| 20 | −135.04 | 0.4 | | |
| 21 | 175.766 | 8.63 | 1.62374 | 47.1 |
| 22 | 618.77 | | | |

-continued

Focal Length f = 100–198  F.No. = 3.5
Image Angel 2ω = 84°–47°

| No. | Radius of Curvature r | Surface Distance d | Refractive Index n | Dispersion ν |
|---|---|---|---|---|
| Focal Length f | | 100 | 140 | 198 |
| Variable Distance d10 | | 144.45 | 61.64 | 4.11 |

EXAMPLE 3

Focal Length f = 100–198  F.No. = 3.5
Image Angle 2ω = 84°–47°

| No. | Radius of Curvature r | Surface Distance d | Refractive Index n | Dispersion ν |
|---|---|---|---|---|
| 1 | 1060.363 | 19.03 | 1.6668 | 33 |
| 2 | −2827.419 | 0.37 | | |
| 3 | 322.581 | 8.57 | 1.72342 | 38 |
| 4 | 85.14 | 39.23 | | |
| 5 | 2120.887 | 14.92 | 1.60323 | 42.3 |
| 6 | −285.242 | 1.12 | | |
| 7 | −425.887 | 6.69 | 1.7725 | 49.6 |
| 8 | 129.194 | 13.35 | | |
| 9 | 128.427 | 19.56 | 1.78472 | 25.7 |
| 10 | 423.456 | d10 | | |
| 11 | 202.379 | 11.96 | 1.63854 | 55.4 |
| 12 | −1137.621 | 7.69 | | |
| 13 | 99.129 | 15.43 | 1.51633 | 64.1 |
| 14 | 323.891 | 0.39 | | |
| 15 | 85.242 | 20.16 | 1.51633 | 64.1 |
| 16 | 260.564 | 8.47 | | |
| 17 | −795.847 | 6.45 | 1.80518 | 25.4 |
| 18 | 66.641 | 11.86 | | |
| 19 | 237.198 | 21.37 | 1.60323 | 42.3 |
| 20 | −124.515 | | | |
| Focal Length f | | 100 | 140 | 198 |
| Variable Distance d10 | | 118.66 | 51.84 | 5.43 |

EXAMPLE 4

Focal Length f = 100–198  F.No. = 3.5
Image Angle 2ω = 84°–47°

| No. | Radius of Curvature r | Surface Distance d | Refractive Index n | Dispersion ν |
|---|---|---|---|---|
| 1 | 611.5508 | 19.03 | 1.66680 | 33 |
| 2 | −3225.81 | 0.37 | | |
| 3 | 685.484 | 8.57 | 1.72342 | 38 |
| 4 | 83.8133 | 51.13 | | |
| 5 | 16791.25 | 14.9 | 1.60323 | 42.3 |
| 6 | −233.2258 | 1.13 | | |
| 7 | −255.605 | 6.69 | 1.7725 | 49.6 |
| 8 | 148.456 | 4.03 | | |
| 9 | 127.806 | 19.56 | 1.6727 | 32.1 |
| 10 | −4849.38 | d10 | | |
| 11 | 195.685 | 11.98 | 1.63854 | 55.4 |
| 12 | −728.024 | 7.71 | | |
| 13 | 98.956 | 15.43 | 1.51633 | 64.1 |
| 14 | 348.297 | 0.39 | | |
| 15 | 94.968 | 20.16 | 1.51633 | 64.1 |
| 16 | 189.552 | 7.02 | | |
| 17 | −866.323 | 15.1 | 1.80518 | 25.4 |
| 18 | 69.419 | 9.07 | | |
| 19 | 193.996 | 21.37 | 1.60323 | 42.3 |
| 20 | −139.032 | | | |
| Focal Length f | | 100 | 140 | 198 |
| Variable Distance d10 | | 117.3 | 50.48 | 4.07 |

EXAMPLE 5

Focal Length f = 100–198  F.No. = 3.5
Image Angle 2ω = 84°–47°

| No. | Radius of Curvature r | Surface Distance d | Refractive Index n | Dispersion ν |
|---|---|---|---|---|
| 1 | 711.279 | 22.07 | 1.6668 | 33 |
| 2 | −3737.096 | 0.44 | | |
| 3 | 794.133 | 9.93 | 1.72342 | 38 |
| 4 | 114.294 | 42.89 | | |
| 5 | 1230.661 | 17.26 | 1.60323 | 42.3 |
| 6 | −366.423 | 1.29 | | |
| 7 | −1178.951 | 7.78 | 1.7725 | 49.6 |
| 8 | 131.815 | 32.26 | | |
| 9 | 154.446 | 22.66 | 1.6727 | 32.1 |
| 10 | 448.812 | d10 | | |
| 11 | 212.245 | 8.19 | 1.51633 | 64.1 |
| 12 | −5424.395 | 0.4 | | |
| 13 | 113.742 | 27.18 | 1.51633 | 64.1 |
| 14 | 879.355 | 0.43 | | |
| 15 | 95.464 | 15.08 | 1.51633 | 64.1 |
| 16 | 798.145 | 13.37 | | |
| 17 | −426.774 | 21.90 | 1.71736 | 29.5 |
| 18 | 64.919 | 13.79 | | |
| 19 | −820.318 | 8.63 | 1.62041 | 60.3 |
| 20 | −143.238 | 0.43 | | |
| 21 | 163.177 | 8.63 | 1.62374 | 47.1 |
| 22 | 437.844 | | | |
| Focal Length f | | 100 | 140 | 198 |
| Variable Distance d10 | | 143.84 | 61.03 | 3.51 |

EXAMPLE 6

Focal Length f = 100–195  F.No. = 3.5
Image Angle 2ω = 82.2°–48.2°

| No. | Radius of Curvature r | Surface Distance d | Refractive Index n | Dispersion ν |
|---|---|---|---|---|
| 1 | 598.981 | 16.421 | 1.60311 | 60.7 |
| 2 | 4138.586 | 0.403 | | |
| 3 | 271.278 | 9.274 | 1.6968 | 55.5 |
| 4 | 83.54 | 34.3 | | |
| 5 | 1499.682 | 14.538 | 1.55963 | 61.2 |
| 6 | −349.565 | 3.891 | | |
| 7 | −425.787 | 7.258 | 1.7725 | 49.6 |
| 8 | 128.512 | 16.781 | | |
| 9 | 129.962 | 13.784 | 1.7552 | 27.5 |
| 10 | 371.853 | d10 | | |
| 11 | 191.133 | 12.517 | 1.6968 | 55.5 |
| 12 | −494.492 | 8.064 | | |
| 13 | 90.5 | 31.428 | 1.65844 | 50.9 |
| 14 | 1206.049 | 7.197 | | |
| 15 | −224.771 | 12.097 | 1.80518 | 25.4 |
| 16 | 82.093 | 13.124 | | |
| 17 | −6882.406 | 10.081 | 1.53172 | 48.9 |
| 18 | −162.768 | 0.605 | | |
| 19 | 2151.097 | 12.097 | 1.53172 | 48.9 |
| 20 | −118.965 | | | |
| Focal Length f | | 100 | 141 | 195 |
| Variable Distance d10 | | 105.58 | 44.64 | 3.951 |

What is claimed is:

1. A two-group type wide-image-angle zoom lens for zooming by changing the distance between the front and the rear group, comprising:
   a front group having a negative refracting power and including a first positive lens, a second negative lens concave toward the image end, a third positive lens, a fourth negative lens concave toward the image end and a fifth positive lens convex toward the object end in sequence; and
   a rear group arranged closer to the image end than the front group, having a positive refracting power and including a first positive sub-group, a second positive sub-group, a third negative sub-group, and a fourth positive sub-group, said lenses and sub-groups exhibiting the relations $$f1 \geq 1.2 f3$$

$$0.06 \leq \frac{r6 - r7}{r6 \cdot r7} \cdot fT \leq 0.39$$

wherein:
 fT is the focal length of the whole system at the end of the telephoto side
 f1 is the focal length of the first positive lens
 f3 is the focal length of the third positive lens
 r6 is the radius of curvature at the rear surface of the third positive lens
 r7 is the radius of curvature at the front surface of the fourth negative lens.

2. A zoom lens according to claim 1, in which the refractive index N4 of the fourth lens is larger than the refractive index N3 of the third lens.

3. A zoom lens in accordance with claim 1, wherein the curvature of the front surface of the first positive lens is larger than that of the rear surface, the second negative lens being a meniscus lens, the curvature of the rear surface of the third positive lens being larger than that of the front surface, the fourth negative lens being a bi-concave lens; the curvature of the front surface of the fifth positive lens being larger than that of the rear surface; the first positive sub-group consisting of a positive lens whose front surface has a larger curvature than the rear surface; the third negative sub-group consisting of a negative lens whose rear surface has a larger curvature than the front lens; and having the relations $$\frac{N1 + N3 + N5}{3} < \frac{N2 + N4}{2}$$

-continued $$0.1 \leq N8 - \frac{N6 + \overline{N7}}{2} \leq 0.36$$

$$0.07 \leq N8 - \overline{N9} \leq 0.32$$

$$\nu 5 \leq 35$$

$$\frac{\nu 6 + \overline{\nu 7}}{2} \geq 49$$

$$\nu 8 \leq 32$$

wherein
 N1, N2, N3, N4, N5 are the respective refractive indices of the first, the second, the third, the fourth and the fifth lens
 N6 is the refractive index of the positive lens of the first sub-group
 $\overline{N7}$ is the mean refractive index of the second sub-group
 N8 is the refractive index of the negative lens of the third sub-group
 $\overline{N9}$ is the mean refractive index of the fourth sub-group
 $\nu 5$ is the Abbe's number of the fifth lens
 $\nu 6$ is the Abbe's number of the first sub-group
 $\overline{\nu 7}$ is the mean Abbe's number of the second sub-group
 $\nu 8$ is the Abbe's number of the negative lens of the third sub-group.

4. The zoom lens in accordance with claim 1, wherein the second negative lens is a negative meniscus lens, the fourth negative lens is a bi-concave lens, the first positive sub-group is a bi-convex lens, the third negative sub-group is a bi-concave lens.

* * * * *